US012291100B2

(12) United States Patent
Heisterkamp et al.

(10) Patent No.: US 12,291,100 B2
(45) Date of Patent: May 6, 2025

(54) METHOD AND DEVICE FOR ADJUSTING A VEHICLE COMPONENT

(71) Applicant: DAIMLER AG, Stuttgart (DE)

(72) Inventors: Paul Heisterkamp, Erbach (DE); Klaus Bader, Oberdischingen (DE); Andreas Luft, Stuttgart (DE); Carsten-Uwe Möller, Neuweiler (DE); Frank Reh, Schwieberdingen (DE); Felix Schüssel, Stuttgart (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 489 days.

(21) Appl. No.: 17/299,090

(22) PCT Filed: Oct. 23, 2019

(86) PCT No.: PCT/EP2019/078903
§ 371 (c)(1),
(2) Date: Jun. 2, 2021

(87) PCT Pub. No.: WO2020/114669
PCT Pub. Date: Jun. 11, 2020

(65) Prior Publication Data
US 2022/0063411 A1 Mar. 3, 2022

(30) Foreign Application Priority Data
Dec. 3, 2018 (DE) ..................... 10 2018 009 487.2

(51) Int. Cl.
G05D 1/00 (2024.01)
B60K 35/10 (2024.01)
(Continued)

(52) U.S. Cl.
CPC ............ *B60K 35/10* (2024.01); *B60R 16/037* (2013.01); *B60K 35/25* (2024.01); *B60K 35/265* (2024.01);
(Continued)

(58) Field of Classification Search
CPC ..................................................... B60K 37/06
See application file for complete search history.

(56) References Cited

U.S. PATENT DOCUMENTS 5,214,707 A      5/1993  Fujimoto et al.
5,555,458 A *    9/1996  Large .................. B64D 11/0015
                                                                340/945

(Continued)

FOREIGN PATENT DOCUMENTS

CN    108327667 A    7/2018
DE    10121392 A1    11/2002
(Continued)

OTHER PUBLICATIONS

YouTube video clip entitled "How to Use 2017 Honda Voice Recognition for Climate Control," 2 pages, uploaded on Nov. 9, 2016 by user "My Toyota Guy Jeff" [retrieved on Oct. 19, 2023]. Retrieved from the Internet: <https://www.youtube.com/watch?v=QBWbcA6YO6I>. (Year: 2016).*

(Continued)

*Primary Examiner* — Vivek D Koppikar
*Assistant Examiner* — Paul W Arellano
(74) *Attorney, Agent, or Firm* — PATENT PORTFOLIO BUILDERS PLLC

(57) ABSTRACT

In a method for adjusting a vehicle component a function of an operating element is selected by a first operating process and the vehicle component is adjusted by a second operating (Continued)

Figure 1:
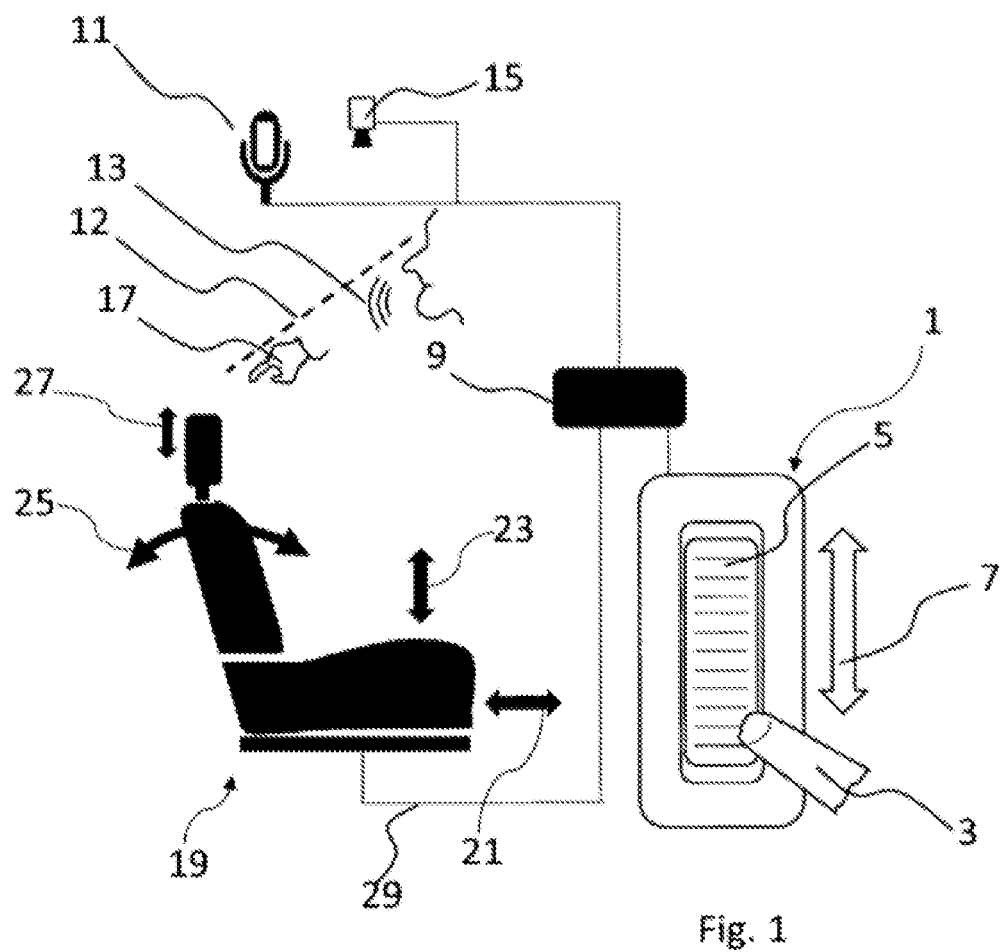

process carried out manually on the operating element. The first operating process is caused by a speech input, a gesture, and/or a gaze.

15 Claims, 2 Drawing Sheets

(51) Int. Cl.
  *B60R 16/037* (2006.01)
  *B60K 35/25* (2024.01)
  *B60K 35/26* (2024.01)
  *B60K 35/28* (2024.01)

(52) U.S. Cl.
  CPC ........ *B60K 35/28* (2024.01); *B60K 2360/122* (2024.01); *B60K 2360/126* (2024.01); *B60K 2360/128* (2024.01); *B60K 2360/133* (2024.01); *B60K 2360/1464* (2024.01); *B60K 2360/148* (2024.01); *B60K 2360/149* (2024.01); *B60K 2360/162* (2024.01)

(56) References Cited

U.S. PATENT DOCUMENTS

| | | | |
|---|---|---|---|
| 6,240,834 B1* | 6/2001 | Chen | A47J 37/0842 99/332 |
| 2005/0134117 A1 | 6/2005 | Ito et al. | |
| 2008/0077291 A1* | 3/2008 | Kolletzki | G06F 3/04847 701/36 |
| 2015/0124988 A1* | 5/2015 | Song | G10L 17/00 381/71.4 |
| 2017/0282717 A1* | 10/2017 | Jang | B60W 40/08 |
| 2017/0293355 A1 | 10/2017 | Mangin | |
| 2018/0024695 A1* | 1/2018 | Iyer | G06F 3/0425 345/175 |
| 2018/0081387 A1* | 3/2018 | Hisada | G05G 9/04792 |

FOREIGN PATENT DOCUMENTS

| | | |
|---|---|---|
| DE | 10229841 A1 | 1/2004 |
| DE | 102016205797 A1 | 10/2017 |
| DE | 102017101669 A1 | 8/2018 |
| KR | 20170061453 A | 6/2017 |
| WO | 02088824 A2 | 11/2002 |

OTHER PUBLICATIONS

YouTube video clip entitled "How To Set Up Your Honda Audio Presets," 1 page, uploaded on Apr. 1, 2017 by user "Atlantic Honda" [retrieved on Oct. 19, 2023]. Retrieved from the Internet: <https://www.youtube.com/watch?v=32tWJ20Tbjo>. (Year: 2017).*

YouTube video clip entitled "How To Use Voice Commands," 1 page, uploaded on Mar. 17, 2015 by user "Howdy Honda" [ retrieved on Oct. 19, 2023]. Retrieved from the Internet: <https://www.youtube.com/watch?v=n3MMDEXMzB4>. (Year: 2015).*

Office Action created Mar. 21, 2022 in related/corresponding DE Application No. 10 2018 009 487.2.

International Search Report mailed Dec. 16, 2019 in related/corresponding International Application No. PCT/EP2019/078903.

Written Opinion mailed Dec. 16, 2019 in related/corresponding International Application No. PCT/EP2019/078903.

Office Action dated Mar. 23, 2024 in related/corresponding Chinese Application No. 201980079111.7.

* cited by examiner

METHOD AND DEVICE FOR ADJUSTING A VEHICLE COMPONENT

BACKGROUND AND SUMMARY OF THE INVENTION

Exemplary embodiments of the present invention relate to a method and a device for adjusting a vehicle component.

An operating element for adjusting vehicle mirrors is known from DE 10229841 A1. Using a switch, optionally either the right or the left outer mirror can be selected for shifting. The actual mirror adjustment is carried out with an operating element formed as a 4-way button, which makes it possible to adjust the mirror on two planes.

It is disadvantageous that the driver is required to avert their gaze in order to operate the switch; before operating the 4-way button, the driver must at least ascertain the position of the switch.

Accordingly, exemplary embodiments of the present invention are directed to a method and a device for adjusting various vehicle components in a simplified manner with an operating element.

In the method according to the invention, a first operating process is induced to select a function of an operating element by means of a speech input, a gesture, and/or a gaze. By means of a speech input, a user can select which vehicle component is to be adjusted by the operating element. For example, the user says, "right front seat's back-rest", whereupon a second operating process for adjusting the back-rest of the right driver's seat can be carried out by the operating element. In contrast to this, after a speech input, "left front seat's seat height", the seat height of the right driver's seat can be shifted by the same operating element. The operating element can be operated in two directions with a finger, for example, and can be designed as a rotating drum, slider bar, rocker switch, touchpad, or touch display. Alternatively, 4-way or multi-way switches can also be used for operating functional elements on several planes. According to the invention, the first operating process as the speech input can also be combined with a pointing gesture; for example, the driver says, "shift the seat horizontally" and points with a finger or directs their gaze towards the right vehicle seat. A gaze includes a gaze gesture in which the gaze direction is directed towards a vehicle component. With the operating element, the right vehicle seat can then be shifted in or in opposition to the driving direction. For example, by rotating a rotating drum in or in opposition to the driving direction, the seat is shifted in the corresponding direction. The seat shifting can be adjusted very accurately by means of a manual operation of the rotating drum. Ideally, the operating element, such as the rotating drum, is arranged in a location that can be easily accessed by the vehicle user and which makes it possible to operate it without averting gaze from the driving events, for example on the steering wheel or on a decorative part of the vehicle. In a further embodiment, the first operating process is carried out exclusively by means of a gesture. For example, a vehicle user points to a vehicle component, for example the sunroof, and can then open or close the sunroof with the operating element. Advantageously, the method makes it possible to manually shift a plurality of vehicle components with a single operating element without distracting from the driving events.

According to a design of the present invention, with the method, a position in the vehicle is determined based on the speech input and a vehicle component allocated to this position is adjusted with the second operating process. In other words, it is determined as to where the vehicle user actuating the speech input and/or the gesture is sitting in the vehicle, for example on the driver or passenger seat. If the speech input is, for example, "shift headrest" and it is ascertained that the user actuating the speech input and/or the gesture is sitting on the passenger seat, then the headrest on the passenger seat is shifted with the manual operation of the operating element. In contrast, if it is ascertained that the speech input and/or the gesture came from the driver's seat, the headrest of the driver's seat is adjusted with the manual operation of the operating element. Along with the seat, the vehicle component allocated to the seat position is, for example, a display, a ventilation nozzle, a vehicle door, or side window etc. By determining the position from which the speech input and/or gesture originates in the vehicle, it can advantageously be established by speech or gesture without specifying the position as to which of the vehicle components present at each seat location is to be adjusted by the second manual operating process on the operating element.

According to a further design of the present invention, alternatively or additionally to the position from which the speech input and/or gesture originates, it is determined from which position in the vehicle the second operating process originates. If it is known whether the driver or the passenger operates the operating element, then the driver's seat or the passenger seat, for example, can accordingly be adjusted with the operating element.

If, in addition to the position from which the speech input and/or gesture is carried out, the position from which the second operating process originates in the vehicle is determined, then the positions from which the first and second operating process originate are made plausible in relation to each other, whereby the method gains reliability. If the two positions match, then it can be determined with a high level of reliability which of the vehicle components is to be adjusted. If the two positions do not match, then an erroneous detection is probable. A piece of information is then relayed to a vehicle user that a detection of the vehicle component to be adjusted has gone wrong.

According to a further design of the present invention, the function selected by the first operating process is confirmed by verbal, graphical or haptic feedback. A piece of information is relayed to the user as to which vehicle component is shifted by manual actuation of the operating element. The user obtains a confirmation from the feedback that their input actuated by the first operating process has been correctly understood and the desired vehicle component can be adjusted with the operating element.

According to a further design of the present invention, the operating process of the vehicle component carried out manually is stored under a label. The label refers to a profile of the vehicle user, for example, wherein the adjustment is stored in the profile. Storing is carried out, for example, by a speech input of the user. In the case of an autonomous detection of the user by the vehicle, for example by means of biometric data, a verbal command such as "save" is sufficient, otherwise the label, under which the adjustment is to be stored, is to be stated.

According to a further design of the present invention, the stored adjustment can be retrieved by verbally stating the label from inside or outside the vehicle.

According to a further design of the present invention, after the first operating process, a second operating process manually carried out causes an adjustment of a vehicle seat, a vehicle mirror, a sunroof, an entertainment system, a steering wheel, or an operation of a vehicle window. The non-exhaustive list shows the variety of the vehicle components that, according to the present method, can advantageously be operated by an operating element.

According to a further design of the present invention, the selected function of the operating element is suspended without user input after a predetermined amount of time. If no or no further actuation of the operating element or no speech input is carried out in the predetermined period of time, then the operating element is switched without function or has a basic function for operating one of the vehicle components mentioned above. Resetting the function of the operating element to the defined function prevents erroneous operation. Alternatively, the operator can also suspend the function by means of an operational action, for example by means of a verbal command such as "adjustment finished" or an otherwise appropriate operation of the operating element such as, for example, a multi-finger gesture on a touchpad.

According to the invention, a device for carrying out the method described above is proposed, the device having:
  an operating element,
  a device by means of which a function of the operating element can be selected,
  a control device connected to the operating element for receiving the function, selected by means of the device, of the operating element, and
  actuators for adjusting vehicle components, which can be controlled by the control device depending on the selected function and an actuation of the operating element,
  wherein the device for selecting the function of the operating element comprises a microphone for detecting a speech input and/or a camera for detecting a gesture and/or a gaze direction.

The device enables a plurality of vehicle components to be operated with a single switching element without distracting from driving events.

BRIEF DESCRIPTION OF THE DRAWING FIGURES

The present invention is explained in more detail below by means of exemplary embodiments with reference to the appended drawings.

Figure 2:
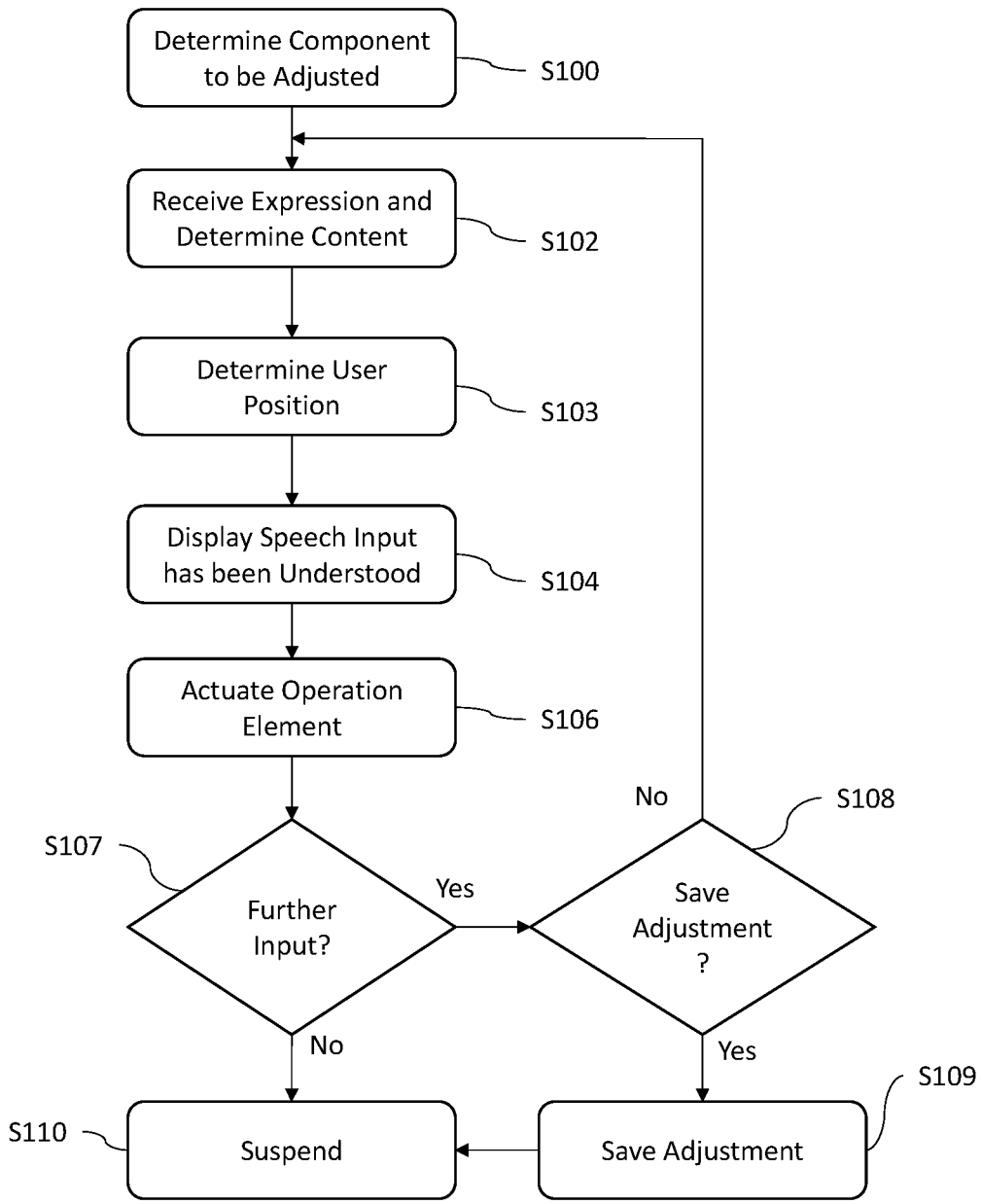

Here are shown:

FIG. 1 a schematic depiction of a device for carrying out the method according to the invention and FIG. 2 flowchart of the method.

DETAILED DESCRIPTION

The operating element 1 shown in FIG. 1 comprises a roller element 5 that can be actuated by a finger 3. The roller element 5 can be rotated in two directions by the finger 3 according to arrow 7.

The operating element 1 is connected to a control device 9. The control device 9 is connected to a microphone 11 for speech input 13 and a camera 15 for recognizing a gesture. Furthermore, the control device 9 is connected to a vehicle seat 19 and is set up to control actuators not depicted for shifting the seat. The control device 9 is specifically set up to control actuators for seat longitudinal shifting 21, for seat elevation shifting 23, for shifting the inclination of the seat back 25, and for headrest elevation shifting 27. The control signals are conveyed from the control device 9, for example via a data bus 29, to a seat control device not shown, by means of which the individual actuators can be controlled for shifting the seat. The control device 9 can here be at least partially integrated in the operating element 1.

In a base setting, no function, for example, is allocated to the operating element 1, i.e., in this state, no shifting of the seat 19 and any other vehicle component is caused by rotating the roller element 5.

If the vehicle user formulates a speech input 13, this is received by the microphone 11 and is conveyed to the control device 9. The speech input 13 is analyzed and interpreted in the control device 9. According to the verbal command 13 understood in terms of content, a function is allocated to the operating element 1, i.e., in other words a signal conveyed from the operating element 1 to the control device is implemented corresponding to the verbal command understood in terms of content. If the verbal command 13 is, for example, "shift seat height", then a signal transmitted to the control device 9 by actuating the roller element is received and conveyed to an actuator via the data bus 29 and the seat control device for shifting the seat height 23. Equally, after conveying a verbal command 13 such as "shift seat longitudinally" 21, "incline the seat back" 25, or "shift the headrest elevation" 27 to the control device 9, a signal generated by the actuation of the operating element 1 is conveyed to the corresponding actuators via the data bus 29 and the seat control device.

In an alternative embodiment not depicted, the data from the control device 9 is not conveyed via a data bus 29 but rather via individual lines directly to the actuators.

In order to ensure that the seat of the user making the speech input 13 is adjusted, it is ascertained from which position, i.e., from which seat, the speech input 13 is carried out. To do so, several microphones are arranged in the interior space; because of different distances of the microphones to the user, these emit temporally offset electrical signals in response to the speech input 13, from which signals the position of the user in the vehicle can be determined. Alternatively, or additionally, the position of a speaking user can also be determined by camera images, for example by analyzing images of the occupants in relation to movement of their lips. If the position of the user is known, then the vehicle component belonging to the user is adjusted in accordance with the speech input. If it is determined that the user making the speech input is positioned on the passenger seat, the passenger seat is adjusted in response to the input "longitudinally shift seat" by actuating the operating element 1. Alternatively, or additionally, the position of the user is determined by means of the direction from which the operating element 1 is operated. In the depiction according to FIG. 1, if the driving direction corresponds to the arrow direction 7, then, as depicted, the operating element 1 is operated by a finger 3 from the right, i.e., from the passenger side. Accordingly, the inclination 25 is adjusted by actuating the operating element 1 following a speech input such as "incline the back rest", for example.

Along with the speech input 13, a function can also be allocated to the operating element 1 by a gesture 17 or a gaze gesture 12 alone, or also by a speech input 13 in combination with a gesture 17 and/or a gaze gesture 12.

If the vehicle user points to a vehicle component to be adjusted, then the image of the interior chamber and gesture 17 captured by the camera is conveyed to the control device 9. From the image, the control device 9 ascertains the vehicle component to be adjusted, for example the headrest 27 determined by the gesture 17. Accordingly, the function of the headrest control is allocated to the operating element 1, i.e., the control device 9 implements the signals generated by the actuation of the operating element 1 in such a way that the vehicle component selected by the gesture 17, i.e., the headrest, is adjusted.

A combination of a speech input 13 with a gesture 17 and/or a gaze gesture 12 is suitable, in particular, if, because of limited recognition capability caused by the system, only a super-ordinated vehicle component such as a vehicle seat and not the component itself that is to be adjusted can be selected by the gesture 13. In the present case, only a right or left vehicle seat would be able to be selected overall by the gesture 17, the specific vehicle component of the vehicle seat to be adjusted is then carried out via the speech input 13, such as "headrest" for example. The control device 9 ascertains the vehicle component to be adjusted from the gesture 17 and speech input 13; a shifting of the ascertained vehicle components is caused by an actuation of the operating element 1.

The flowchart shown in FIG. 2 describes an embodiment of the method according to the invention for shifting one or more vehicle components with a single operating element based on a speech input 13. In step S100, with a speech input 13, a vehicle user determines a vehicle component to be adjusted, for example with the expression "headrest". The expression transmitted by a microphone is received in step S102 by a speech recognition system in a control device 9, and the content of the expression is determined. In step 103, the position of the user in the vehicle is ascertained. For example, it is determined that the user is sitting on the driver's seat. In a step S104, it is displayed to the user via a display that their speech input 13 has been understood, and the function transmitted with the speech input and allocated to the position of the user is selected for the operating element 1 from FIG. 1. If the vehicle component to be adjusted, such as the sunroof, for example, is not allocated to a position in the vehicle, i.e., a seat location, then step S103 is skipped.

In the present example, the function "adjusting the height of the left headrest" is assigned to the operating element 1 by the control device 9. In step S106, the vehicle user actuates the operating element 1, which then causes a shifting of the headrest by the operation of generated signals. To do so, the generated signals are received by the control device 9 and conveyed to an actuator for shifting the headrest. An actuation of the roller element 5 in opposition to the driving direction causes an approach in the driving direction, a retraction of the headrest.

In step S107, it is checked as to whether a further speech input or actuation of the operating element is carried out within a predetermined period of time. If a speech input takes place before the end of the predetermined period of time, then it is checked in step S108 as to whether the renewed speech input relates to saving the adjustment performed in a profile by mentioning a label or relates to a new vehicle component. If the speech input relates saving, then the adjustment is saved in step S109 and the method ends in step S110. If the input relates to a new vehicle component, such as "mirror", for example, then the method is continued again in step S102.

After saving the profile in S109, after the absence of an actuation of the operating element 1 or a renewed speech input within a predetermined period of time in S107, the function allocated to the operating element by the speech input 13 in S100 or S108 is suspended in step 110, whereby the operating element 1 either has no function or a default function, i.e., for example a volume adjustment device of an entertainment system. It is displayed to the user via the display that the function selected previously by the speech input is no longer active.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for adjusting a vehicle component using an operating element, the method comprising:
    detecting a speech input;
    allocating a function, which controls the vehicle component, to the operating element based on the detected speech input, wherein the operating element has no function prior to allocating the function to the operating element;
    determining a position in the vehicle from which the speech input originates;
    adjusting the vehicle component by an operating process carried out manually on the operating element, wherein the adjusted vehicle component is allocated to the determined position and is adjusted based on the operating process carried out manually on the operating element; and
    suspending the allocated function of the operating element after an end of a predetermined period of time without input by a user, wherein after the suspending of the allocated function, the method comprises:
    detecting another speech input;
    allocating another function, which controls another vehicle component, to the operating element based on the detected speech input, wherein the operating element has no function prior to allocating the another function to the operating element;
    determining a position in the vehicle from which the another speech input originates;
    adjusting the another vehicle component by another operating process carried out manually on the operating element, wherein the adjusted another vehicle component is allocated to the determined position and is adjusted based on the another operating process carried out manually on the operating element; and
    suspending the allocated another function of the operating element after an end of a predetermined period of time without input by the user.

2. The method of claim 1, further comprising:
    confirming the function selected by the detected speech input using verbal, graphical, or haptic feedback.

3. The method of claim 1, further comprising:
    saving the adjustment of the operating process of the vehicle component with a label.

4. The method of claim 3, further comprising:
retrieving the saved adjustment by verbal specification of the label from inside or outside the vehicle.

5. The method of claim 1, wherein the operating process causes an adjustment of one of the following vehicle components:
a vehicle seat,
a vehicle mirror,
a vehicle window,
a sunroof,
an entertainment system, and
a steering wheel.

6. A device for adjusting a vehicle component of a vehicle, the device comprising:
an operating element;
a microphone configured to detect a speech input, wherein the microphone is configured to determine a position in the vehicle from which the detected speech input originates;
a control device connected to the operating element, wherein the control device is configured to allocate a function, which controls the vehicle component, to the operating element based on the detected speech input, wherein the operating element has no function prior to allocating the function to the operating element, wherein the control device is connected to actuators to adjust vehicle components depending on the selected function and a manual actuation of the operating element by an operating process, wherein the adjusted vehicle components are allocated to the determined position and are adjusted based on the operating process, wherein the selected function of the operating element is suspended after an end of a predetermined period of time without input by a user,
wherein the control device is configured so that wherein after the suspending of the allocated function, the control device is configured to:
detect another speech input;
allocate another function, which controls another vehicle component, to the operating element based on the detected speech input, wherein the operating element has no function prior to allocating the another function to the operating element;
determine a position in the vehicle from which the another speech input originates;
adjust the another vehicle component by another operating process carried out manually on the operating element, wherein the adjusted another vehicle component is allocated to the determined position and is adjusted based on the another operating process carried out manually on the operating element; and
suspend the allocated another function of the operating element after an end of a predetermined period of time without input by the user.

7. The device of claim 6, wherein the operating process causes an adjustment of one of the following vehicle components:
a vehicle seat,
a vehicle mirror,
a vehicle window,
a sunroof,
an entertainment system, and
a steering wheel.

8. The method of claim 1, wherein the suspending of the selected function resets a function of the operating element.

9. The method of claim 1, wherein the suspending of the selected function changes a function of the operating element.

10. The method of claim 1, wherein the suspending of the selected function switches to operating element to have no assigned function.

11. The method of claim 1, wherein the operating element is a rotating drum.

12. The device of claim 6, wherein the suspending of the selected function resets a function of the operating element.

13. The device of claim 6, wherein the suspending of the selected function changes a function of the operating element.

14. The device of claim 6, wherein the suspending of the selected function switches the operating element to have no assigned function.

15. The device of claim 6, wherein the operating element is a rotating drum.

* * * * *